United States Patent [19]
Walters

[11] Patent Number: 5,490,146
[45] Date of Patent: Feb. 6, 1996

[54] DIGITAL MOBILE RADIO SYSTEM INTERFACING AN ISDN STANDARD BUS SYSTEM

[75] Inventor: Eckhard Walters, Rötenbach and der Peg., Germany

[73] Assignee: U.S. Philips Corporation, New York, N.Y.

[21] Appl. No.: 369,554

[22] Filed: Jan. 6, 1995

Related U.S. Application Data

[63] Continuation of Ser. No. 934,987, Aug. 25, 1992, abandoned.

[30] Foreign Application Priority Data

Sep. 10, 1991 [DE] Germany .......................... 41 30 001.7

[51] Int. Cl.$^6$ .................................................. H04Q 7/20
[52] U.S. Cl. .................. 370/95.1; 370/110.1; 379/58
[58] Field of Search .................. 370/95.1, 110.1, 370/79, 85.1; 379/59, 61, 63, 58; 455/33.1, 54.1

[56] References Cited

U.S. PATENT DOCUMENTS

| | | | |
|---|---|---|---|
| 5,157,660 | 10/1992 | Kuwahara et al. | 370/95.1 |
| 5,168,498 | 12/1992 | Adams et al. | 370/95.1 |
| 5,274,694 | 12/1993 | Lechner et al. | 379/63 |
| 5,329,531 | 7/1994 | Diepstraten et al. | 370/94.2 |
| 5,359,603 | 10/1994 | McTiffin | 370/94.1 |

FOREIGN PATENT DOCUMENTS

| | | |
|---|---|---|
| 0404994 | 1/1991 | European Pat. Off. . |
| 3806473 | 9/1989 | Germany . |
| 2243973 | 11/1991 | United Kingdom . |

OTHER PUBLICATIONS

J. Schuck, W. Rosenkranz, J. Weith and P. Schoffel, Ein GSM–Chipstaz dern zweiten Generation, May 1991, pp. 72–77.

P. Schoffel, W. Koch, W. Rosenkranz and J. Weith, Architektur einees Mobilfunkgerates fur das Netz D, Jan./1991, pp. 132–139.

P. Robert & P. Triellard, Alcatel Land Mobile System CD900 A Fully Digital Cellular Approach Using Wideband TDMA, IEEE, Mar. 1987, pp. 0759–3765.

S. Suzuki et al, Signaling Protocol Architecture for Digital Mobile System, IEEE, 1989, pp. 729–734.

*Primary Examiner*—Douglas W. Olms
*Assistant Examiner*—Min Jung
*Attorney, Agent, or Firm*—Leroy Eason

[57] ABSTRACT

A mobile radio system includes a mobile radio base station and a user voice and/or data terminal remote therefrom, the base station being coupled to the user terminal by an ISDN standard bus system which provides channels for digital control and other information signals. Control circuits in the base station and in the user terminal supply switching control signals relating to the transmitted information signals. Since highly integrated circuit interface modules are already available for ISDN standard bus systems, use of such a bus system significantly reduces the cost of the complete mobile radio system.

4 Claims, 1 Drawing Sheet

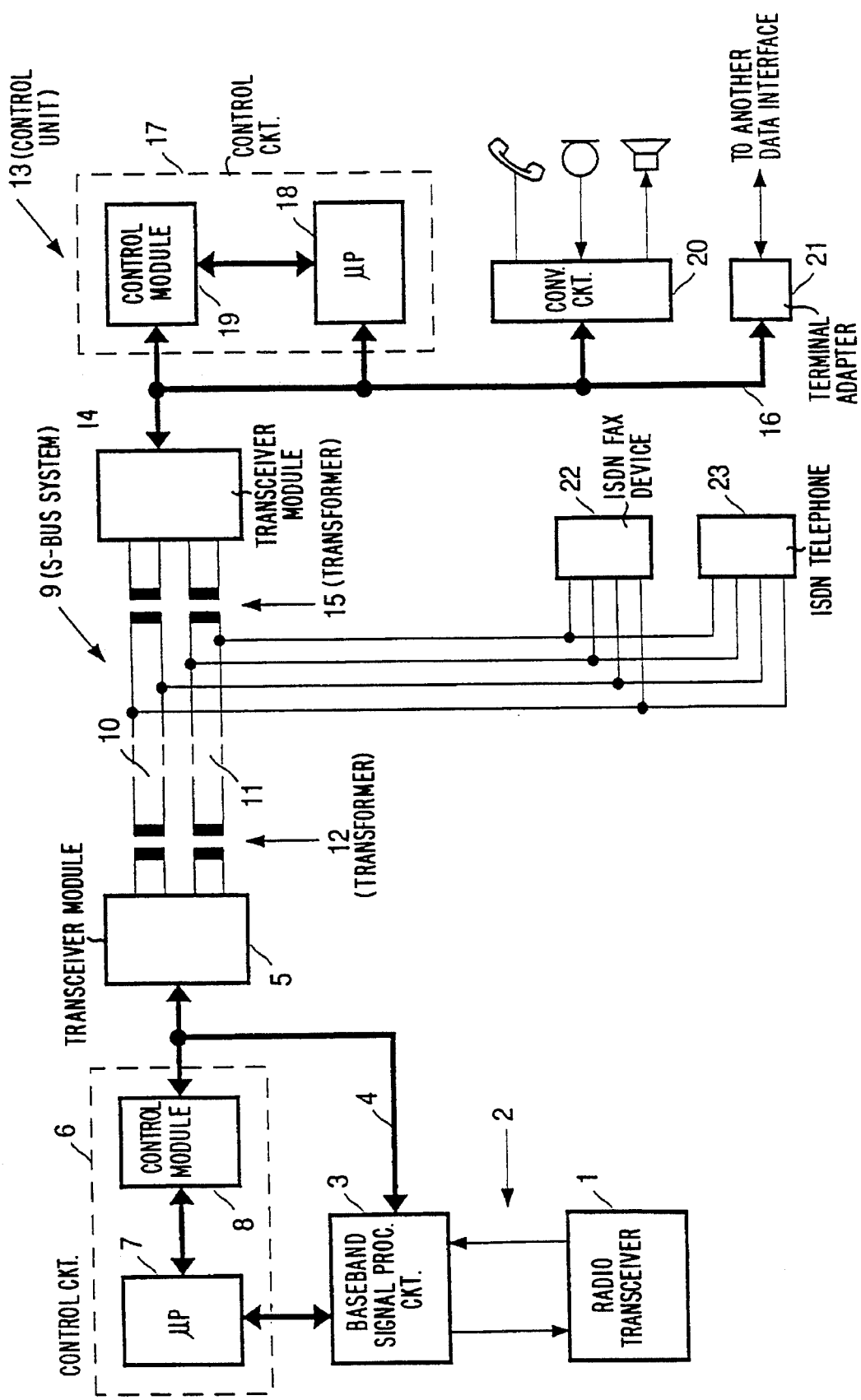

DIGITAL MOBILE RADIO SYSTEM INTERFACING AN ISDN STANDARD BUS SYSTEM

This is a continuation of application Ser. No. 07/934,987, filed Aug. 25, 1992 now abandoned.

BACKGROUND OF THE INVENTION

The invention relates to a mobile radio system comprising a base station which includes a transceiver for processing radio signals and a baseband signal processing circuit for transmitting signals to a control unit over a bus system.

Such a mobile radio system is known from DE-C2-38 06 473. It comprises a control unit, a transceiver and an adapter for exchanging signals between the control unit and the transceiver. A transceiver usually comprises a transceiver section for radio signal processing and a circuit for baseband signal processing. The adapter comprises a microprocessor and a plurality of interfaces. The adapter is further coupled to a workstation by way of such an interface. The microprocessor is used for monitoring and connection into the communication path between transceiver and control unit and controls the further transport of workstation data. Furthermore, there are serial interfaces inserted between the adapter and the control unit and transceiver respectively, over which interfaces the reports and commands are transmitted.

The publication entitled "Architektur eines Mobilfunkgerätes für das Netz D" by P. Schöffel, W. Koch, W. Rosenkranz and J. Weith, Philips Innovation 1/1991, pp. 132 to 139, has disclosed a further mobile radio system . It comprises a transceiver, a circuit for baseband signal processing, a set control and a handset. The speech signal available as an electric signal is transmitted between the baseband signal processing circuit and the handset over a PCM bus system (cf. picture 5, page 135). Such a PCM bus system to be used in a mobile radio system has to date not yet been standardized. High development costs are necessary for developing such a bus system, because such a bus system is also to be suitable for connection of facsimile devices. With this mobile radio set, control signals, for example, are transmitted by different lines.

SUMMARY OF THE INVENTION

Therefore, it is an object of the invention to provide a mobile radio system in which data are transmitted in a simple manner between the baseband signal processing circuit and the control unit.

In a mobile radio system of the type mentioned in the opening paragraph the object is achieved, in that for transmitting control and data signals the baseband signal processing circuit and the control unit are coupled by way of a bus system which operates according to an ISDN standard. A control unit should be also understood to mean a handset which comprises a microphone and a loudspeaker.

The concept of "ISDN" means an Integrated Services Digital Network by which different communication services may be carried out. In the subscriber terminal zone of such a network a plurality of subscriber sets may be coupled by way of a bus system which is designated as an S-bus system. Speech signals and control information signals are transmitted over the S-bus system. Each subscriber set is coupled to the S-bus system by way of an SO interface. Two B channels having each a capacity of 64 kbit/s are available for the transmission of narrow-band messages (speech, data, text communication etc.). A D-channel with 16 kbit/s is available as a signalling channel for transmitting switching control signals.

As a result of the use of an S-bus system between the control unit and the baseband signal processing circuit, no high development costs are necessary because interface modules with a high degree of integration are available. The switching control signals, which are exchanged over the D-channel, are specified. The speech data are transmitted over the B channels. Key, display and other control information signals may be sent over either the D or B channels, as required. Furthermore, there are also highly integrated modules available which cooperate with the interface modules.

The control unit comprises a first transceiver module coupled to an SO interface, which module supplies, over a first bus system, the signals sent over the S-bus system, to at least one converter circuit inside the set. The converter circuit converts analog speech signals into digital speech signals by way of analog-to-digital conversion and then performs an encoding operation. Furthermore, it also converts in a digital-to-analog converter digital speech signals into analog speech signals after a decoding operation. A first control circuit for processing the D-channel information signals is coupled to the first bus system inside the set. The control circuit evaluates received D-channel information signals and also generates such information signals for transmission.

A terminal adapter which performs an adaptation between the S-bus system and another data interface, for example a V24 interface, can be connected to the first bus system inside the set.

The use of the S-bus system also enables further sets operating according to the ISDN standard to be coupled to the S-bus system, each by way of an SO interface. For example, an ISDN facsimile device or also an ISDN standard telephone may be connected.

The baseband signal processing circuit is coupled to a second transceiver module by way of a second bus system inside the set. The second transceiver module comprises a coupling to an SO interface. A second control circuit, which generates D-channel information signals for transmission and evaluates received D-channel information signals, is coupled to the second bus system inside the set. Such a second control circuit may comprise a processor, as may also the first control circuit.

An illustrative embodiment of the invention will be further explained with reference to the drawing figure.

BRIEF DESCRIPTION OF THE DRAWING

The sole FIGURE is a block diagram of part of a mobile radio set according to the invention.

DESCRIPTION OF THE PREFERRED EMBODIMENT

The mobile radio system represented in the Figure comprises a transceiver section 1 which is used for generating and receiving radio signals. Via a baseband interface 2 the transceiver section 1 is connected to a baseband signal processing circuit 3. Such a circuit 3 may comprise, for example, a gate array or a digital signal processor. Such a digital signal processor is known, for example, from the publication entitled "Ein GSM Chipsatz der zweiten Generation" by J. Schuck, W. Rosenkranz, J. Weith and P.

Schöffel, Mikroelektronik, Vol. 5, 1991, No. 2, pp. 72 to 77. The baseband signal processing circuit 3 is provided for adaptive channel equalization, channel encoding and decoding, enciphering and deciphering and, finally, for speech encoding and decoding.

The baseband signal processing circuit 3 is connected to a transceiver module 5 and a control circuit 6 by way of a bus system 4 inside the set. The control circuit 6 comprises, in addition to a control module 8, a microprocessor 7 connected to the circuit 3 by way of a different bus system. The microprocessor 7 and the control circuit 8 are interconnected by way of still further lines. Over the bus system 4 inside the set, baseband signal processing circuit 3 supplies or receives speech and data information signals to/from the transceiver module 5 over the two B channels. The control circuit 6 supplies or receives D-channel information signals by way of the control module 8. The D-channel information signals are evaluated by the microprocessor 7 which also sends D-channel information signals to the control module 8. The control module 8 is used for tapping information signals from the D-channel or feeding information signals thereto.

Key, display and further control information signals may be transmitted either by a D or a B channel.

The transceiver module 5 transmits the B and D-channel information signals between the bus system 4 inside the set and an S-bus system 9. The S-bus system comprises a pair of send wires 10 and a pair of receive wires 11. Via an SO interface the transceiver module 5 is coupled to the two pairs of wires 10 and 11 by way of transformer 12. Furthermore in a user terminal at the other end of S-bus system, a control unit 13 is coupled to the S-bus system 9 via an SO interface. Control unit 13 may be in the form of a handset comprising control functions or a handsfree facility comprising further arrangements, for example, a terminal adapter.

The control unit 13 comprises a transceiver module 14 which is coupled to the pair of send wires 10 and pair of receive wires 11 of the S-bus system 9 by way of transformer 15. The transceiver module 14 transmits the B-channel and D-channel information signals between the S-bus system 9 and a further bus system 16 inside the user terminal. A further control circuit 17 comprising a microprocessor 18 and a monitoring module 19 is connected to the bus system 16 inside the user terminal. The microprocessor 18 and the monitoring module 19 are intercoupled by way of further lines. Furthermore, a converter circuit 20 is connected to the bus system 16 inside the terminal. The converter circuit 20 is used for converting the analog speech signals received by way of a microphone capsule into digital signals and for encoding the digital signals. The converter circuit 20 further decodes the digital signals produced by the bus system 16 and converts, by means of a digital-to-analog converter, the digital decoded signals into analog speech signals which are received by a loudspeaker. The microphone capsule or the loudspeaker may form part of a handset or of a handsfree facility.

An ISDN terminal adapter 21 which is further connected to an external data interface, for example, a V24 interface, is connected to the bus system 16 inside the user terminal. The ISDN terminal adapter 21 provides a matching between the external interface and the bus system 16.

The circuit elements known from EP-A1-0 404 994 may be used as transceiver modules 5 and 14, as the converter circuit 20, as the ISDN terminal adapter 21, as control circuits 6 and 17 comprising the control modules 8 and 19, and as the microprocessors 7 and 18. Furthermore, an ISDN facsimile device 22 and an ISDN standard telephone 23 may be connected to the S-bus system 9.

In the following the operation of the microprocessor 7 will be represented with reference to two program routines for the transmission of control information signals or dam. First a main program is carded out which may be interrupted by means of an interrupt i.e. an event. Such an interrupt may be, for example, a message which is announced over the D channel.

1. Start of the main program;
2. Program data are initialized;
3. Input from user or messages from the circuits are entered;
4. Is the pointer "new message" set?
   5. Affirmative:
      6. The data are evaluated;
      7. The pointer "new message" is reset;
      8. Further to 11;
   9. Negative:
      10. Further to 11;
11. Is the pointer "transmission permitted" set?
    12. Negative:
        13. Further to 3;
    14. Affirmative:
        15. Is the pointer "repeat transmission" set?
    16. Affirmative:
        17. Repeat transmission of most recent message;
        18. The "repeat transmission" pointer is reset;
        19. Further to 22;
    20. Negative:
        21. Further to 22;
22. Is the "message under way" pointer set?
    23. Affirmative:
        24. Further to 3;
    25. Negative:
        26. Are data to be transmitted?
    27. Negative:
        28. Further to 3;
    29. Affirmative:
        30. The stored data are transmitted;
        31. The "message under way" pointer is set;
        32. Further to 3.

After the start of the main program (1.) the program data are initialized (2.) and inputs from the user or messages from the circuits are entered (3.). If data are found, i.e. the "new message" pointer is set, the data are evaluated and the "new message" pointer is reset (5. to 8.). In the case where the "new message" pointer is not set, a check is made whether the "transmission permitted" pointer is set. If the "transmission permitted" pointer is not set, item 3 is reverted to (9. to 13.). Otherwise, a check is made whether the "repeat transmission" pointer is set. If the "repeat transmission" pointer is set, the D-channel information is released that the most recent message is to be transmitted again. Then the "repeat transmission" pointer is reset (14. to 19.). Subsequently, the next item checked is whether the "message under way" pointer is set. If it is, item 3 is reverted to (23. to 24.). Otherwise, if the "message under way" pointer is not set, a check is made whether data are still to be transmitted (25. to 26.). Otherwise, the stored data are transmitted and the "message under way" pointer is set. Subsequently, item 3 of the main program is reverted to (29. to 32.).

The main program may also be interrupted by an interrupt. In the following a program routine will be represented for the case where an interrupt occurs. Such an interrupt may be, for example, the arrival of data (level 2) or a physical change (level 1) (interruption of a line of the S-bus system 9).

1. Interrupt occurs;
2. Which interrupt occurs?
    3. A level-1 interrupt occurs;
4. The new state of level 1 is stored;
5. Is the level 1 able, d?
    6. Affirmative:
        7. The "transmission permitted" pointer is set;
        8. Further to 39;
    9. Negative:
10. Is the level 1 disabled?
    11. Affirmative:
        12. The "transmission permitted" pointer is reset;
        13. Further to 39;
    14. Negative:
        15. Further to 39;
16. There is a level-2 receive message;
17. Is the message error-free?
    18. Negative:
        19. Further to 29;
    20. Affirmative:
21. Is the message a control message for the level 2?
    22. Affirmative:
        23. The state of level 2 is reset to an initial state;
        24. Further to 29;
    25. Negative:
        26. The message is buffered;
        27. The "new message" pointer is set;
        28. Further to 29;
29. The receiver memory is released for a new message;
30. Further to 39;
31. There is a level-2 send message;
32. Have the data been transmitted error-free?
    33. Affirmative:
        34. The "message under way" pointer is reset;
        35. Further to 39;
    36. Negative:
        37. The "repeat transmission" pointer is set;
        38. Further to 39;
39. End of the interrupt.

When there is an interrupt, a check is made which interrupt occurs (1. to 2.). A total of three interrupts may occur. A level-1 interrupt may occur, there may be a level-2 receive message, or a level-2 transmit message may have been acknowledged. The level 1 describes the physical conditions of an interface, the line structure, the way of transmission, supply and synchronization and the channel structure. The level 2 determines the data protection in the D-channel and parts of the addressing.

When a level-1 interrupt (3.) occurs, the new state of level 1 is stored (4.1). Then check is made whether the level 1 is abled i.e. whether there is a possibility for transmission. When the level 1 is abled, the "transmission permitted" pointer is set. Subsequently, the interrupt is terminated (5. to 8.). Otherwise, a check is made whether the level 1 is disabled (9. to 10.). If this is the case, the "transmission permitted" pointer is reset and the interrupt is terminated (11. to 13.). In the other case, when the level 1 has not yet been disabled, the interrupt is also terminated (14. to 15.).

When a level-2 receive message, a check is made whether the message is error-free (16. to 17.). If this is not the case, the receiver memory is released for a new message and the interrupt is terminated (18. to 19.). If the message is error-free, a check is made whether the message is a control message for the level 2 (20. to 21.). If this is the case, the state of the level 2 is reset to an initial state, the receiver memory is released for a new message and the interrupt is terminated (22. to 24.). If no control message is present for the level 2, the message is buffered and the "new message" pointer is set (25. to 28.). Then the receiver memory is released for a new message and the interrupt is terminated.

When a level-2 receive message is acknowledged, i.e. the control circuit 6 has sent a message over the D-channel to a device connected to the S-bus system 9, a check is made whether the data have been transmitted error-free (29. to 32.). If this is the case, the "message under way" pointer is reset and the interrupt is terminated (33. to 35.). If the data are not transmitted error-free, the "repeat transmission" pointer is set and the interrupt is terminated (36. to 39.).

I claim:

1. A mobile radio system comprising a base station for radio communication with at least one mobile station, a user terminal remote from said base station, and a bus system for digital signal transmission between said base station and said user terminal; characterized in that:

said bus system is an ISDN standard S-bus having two B channels for message transmission and a D channel for transmission of switching control signals for routing and servicing of transmitted messages;

said base station comprises:
   a radio transceiver for transmitting and receiving messages by radio;
   a baseband signal processing circuit coupled to said transceiver for (i) recovering digital baseband signals from received radio messages, (ii) converting into radio messages digital baseband signals which are to be transmitted;
   a first transceiver module for coupling said baseband signal processing circuit to said S-bus and (i) converting baseband signals received from said baseband signal processing circuit into transmission signals in accordance with ISDN standards, and supplying the ISDN transmission signals to said S-bus for transmission over B channels thereof, and (ii) converting ISDN transmission signals received from B channels of said S-bus into baseband signals, and supplying the baseband signals to said baseband signal processing circuit for conversion into radio messages; and
   a first control circuit coupled to said first transceiver module and to said baseband signal processing circuit, said first control circuit comprising a first microprocessor for providing switching control signals to said first transceiver module applicable to transmission signals to be transmitted thereby over said S-bus, said switching control signals being transmitted over the D channel of said S-bus;

said user terminal comprises:
   a local bus system and a second transceiver module coupling said local bus system to said S-bus, said second transceiver module (i) converting transmission signals received from said S-bus into digital signals which are digitized equivalents of analog signals, and supplying said digital signals to said local bus system, and (ii) converting digital signals received from said local bus system into transmission signals in accordance with ISDN standards, and supplying the ISDN transmission signals to said S-bus for transmission over B channels thereof;

a second control circuit coupled to said second transmission module and to said local bus system, said second control circuit comprising a second microprocessor for providing switching control signals to said second transmission module applicable to transmission signals to be transmitted thereby over said S-bus, said switching control signals being transmitted over the D channel of said S-bus; and circuit means coupled to said local bus system for converting digital signals received therefrom into analog signals, and converting externally supplied analog signals received by said circuit means into digital signals which are supplied to said local bus system for transmission to said second transceiver.

2. A mobile radio system as claimed in claim 1, wherein said S-bus is coupled to said first and second control circuits by respective SO interfaces which operate in compliance with ISDN standards.

3. A mobile radio system as claimed in claim 1, wherein said local bus system is coupled to a terminal adapter for data communication, and the digital signals on said local bus system are data signals.

4. A mobile radio system as claimed in claim 1, wherein said S-bus is further coupled to an auxiliary terminal device which transmits and receives transmission signals which are in accordance with ISDN standards.

* * * * *